Dec. 9, 1947.    J. KANTOR    2,432,163
PLASTIC CROWNER
Filed Jan. 11, 1943    3 Sheets-Sheet 1

INVENTOR.
James Kantor,
BY: Wood & Hahn
ATTORNEYS.

Dec. 9, 1947.       J. KANTOR       2,432,163
PLASTIC CROWNER
Filed Jan. 11, 1943      3 Sheets-Sheet 3

INVENTOR.
James Kantor,
BY: Hood & Hahn.
ATTORNEYS.

Patented Dec. 9, 1947

2,432,163

UNITED STATES PATENT OFFICE 2,432,163

PLASTIC CROWNER

James Kantor, Chicago, Ill., assignor to The Liquid Carbonic Corporation, Chicago, Ill., a corporation of Delaware Application January 11, 1943, Serial No. 471,986

2 Claims. (Cl. 219—34)

1

The present invention relates to improvements in apparatus for applying crowns to bottles and other containers.

One of the principal objects of the invention is to provide a crowning mechanism which is capable of handling the type of plastic crowns which have been developed to take the place of metal crowns heretofore used.

The present type of plastic crown is thermal plastic and as a result must be heated to render the same sufficiently plastic for molding about the neck of the container prior to its placement on the container. With the material of the crown rendered sufficiently soft by heat, the crown may then be molded about the container.

It is an object of the present invention to provide a crowning mechanism wherein, as the plastic crown is delivered to the container to be crowned, the material thereof is heated sufficiently to render the same pliable to permit it being molded in position. As soon as the material has been molded in position, it becomes sufficiently cool to retain itself in its sealed position.

For the purpose of disclosing the invention I have illustrated embodiments thereof in the accompanying drawings, in which Fig. 1 is a front elevation of a crowning machine embodying my invention;

Figure 5:
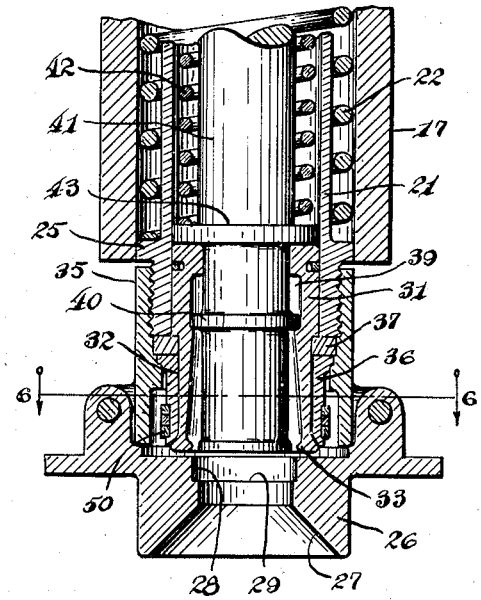
Figure 6:
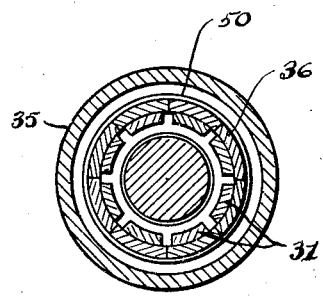

Fig. 5 a detail longitudinal section of a modification of the crown applying mechanism; and Fig. 6 is a sectional view taken on the line 6—6 of Fig. 5.

In the embodiment of the invention illustrated, I provide a rotary head 1 which is more or less of standard commercial form, which head is provided with a plurality of crowners 2 each of which is of the same construction and therefore a later description of one will be sufficient. Each of these crowners, as it moves into position over the receptacle to be crowned, due to the rotary movement of the head 1, is adapted to place a crown on the receptacle. The rotary head is provided with a crown hopper 3, which delivers through a selected mechanism 4 into the crown chute 5. Through the medium of the selected mechanism 4 the crowns are delivered, one at a time, into the chute with the opposite side of the crown in a

Figure 4:
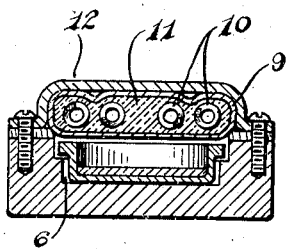
Fig. 4 is a transverse section of a portion of the crown chute showing the heating medium.

2 position to be deposited in the crowning mechanism with the opposite side directed toward the receptacle to be crowned. This chute 5 is provided with a guiding groove 6, see Fig. 4, along which the crowns are adapted to slide by gravity and the chute is pivoted, as at 7, to the head to permit the lower end to swing in and out of position for delivering the crowns, one at a time, to the crown seat of the mechanism. For directing the crowns into the mechanism, the lower end of the chute 5 has an inward curve, as at 8, with the delivery mouth of the chute disposed adjacent the crown receiver of the mechanism.

The chute groove 6 is covered by a suitable cover 9 which has arranged therein a series of resistance elements 10 adapted to be embodied in suitable insulating material 11. This cover is held in position on the chute through the medium of straps 12 which, at their outer extremities, are screwed or bolted to the chute proper. In practice, I find it advantageous to make this cover portion in two sections such as 13 and 14, each section being provided with suitable binding posts 15 to which suitable electric wires may be attached for energizing the heating elements 10 in the cover. By this arrangement, I am enabled to obtain zones of different temperatures throughout the length of the chute. Preferably, the upper zone has the highest heating capacity to quickly heat the crowner, the heat being maintained in the lower zone by the heating elements of that zone which has a lower heating capacity. It is to be noted that the chute 5 is given a decided offset bend, as at 16, so that the length of travel of the chute to its delivery point will be increased and so that the movement of the crowns through the chute will be somewhat retarded to permit more thorough heating of the crown prior to its delivery to the crowning mechanism. Furthermore, the heating elements are more closely adjacent the sides of the chute so that primarily the skirt of the crown is heated in preference to heating the entire crown. Also by providing the bend in the chute there is a tendency for the crown to rotate during its travel through the chute, thus more evenly distributing the heat. For controlling the heat to be applied to the crown, I preferably employ thermostatic controls (not shown) for controlling the circuit of the resistance elements.

Each of the heads 1 comprises a hollow cylindrical housing 17 carrying at its upper end a roller 18 adapted to engage a relatively stationary cam track 19 through the medium of which the housing 17 is adapted to be reciprocated vertically to move the crowning mechanism down to the crown receiving receptacle 20 which is vertically stationary. This receptacle usually is in the form of a bottle and, for convenience hereinafter, will be referred to as a bottle.

Reciprocably mounted within the housing 17 is arranged a hollow sleeve 21 which is adapted to be moved into a projected position through the medium of a coil spring 22 surrounding the sleeve and bearing at its upper end against a ring 23 seated on a shoulder 24 in the housing 17. The lower end of this spring bears on an annular flange 25 carried at the lower end of the sleeve 21.

The housing 17 at its lower end carries a crown receiving throat 26 which is provided with a bell shaped mouth 27 and an opening 28 therethrough of sufficient size to permit the passage therethrough of the neck of the bottle. This throat 26 is provided with an annular shoulder 29 and on its side is provided with an opening 30 through which the crowns are adapted to be fed from the delivery end of the chute 5 onto the shoulder 29, whereon they rest until the mechanism is moved downwardly to place the crown on the bottle neck. It is to be understood that during the reciprocating movement of the crowning mechanism, the chute is swung outwardly to clear its lower end from the crowning mechanism.

Within the sleeve 21 is a crown molding mechanism comprising a plurality of segmental members 31 which, together, form a complete circular throat, the lower end of which tapers slightly outward as at 32 and terminates with an annular inturned lip 33 and an annular outward cammed surface 34. Surrounding this throat, and within the lower end of a screw threaded cap 35 on the sleeve 21, is a sleeve 36 which is locked against vertical movement by a collar 37 abutting against a shoulder on the cap 35 and against the lower end of the sleeve 21. The upper portion of the segmental molding mechanism 31 is provided with a longitudinal groove 39 which receives an annular flange 40 on a plunger 41. This plunger 41 is mounted within the sleeve 21 and is biased in a downward direction through the medium of a coil spring 42 surrounding the plunger and bearing at its upper end against a shoulder in the sleeve 21 and at its lower end against an annular shoulder 43 on the plunger.

The sleeve 21 has longitudinal slots in its sides which receive a pair of retaining dogs 44 pivoted at 45 to the sleeve and having their noses 46 adapted to engage in a groove formed between the rings 23. Normally the sleeve is maintained in its raised position against the influence of the coiled spring 22 through the engagement of the dogs in the notch formed in the rings 23. These dogs are maintained in their engaging positions through a head 47 of the plunger 41 which fits between the upper portions of the dog and is held in this position through the influence of the coiled spring 42.

Figure 3:
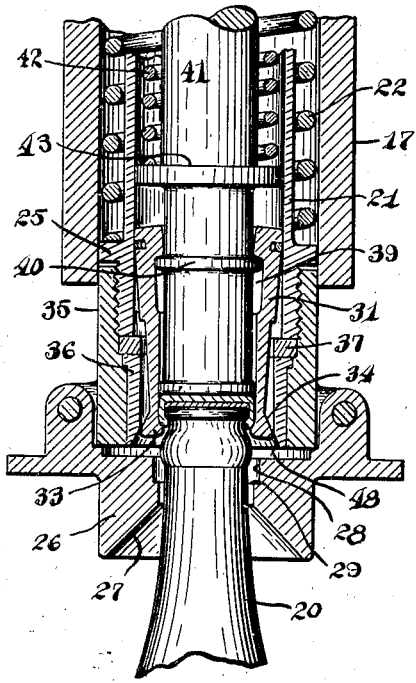
Fig. 3 is a longitudinal sectional view of a portion of the crown mechanism showing the crown in position on the container to be sealed.

In operation, while the crown mechanism is in its raised position a heated crown is delivered on the seat 29 of the crown throat. Immediately after the heated, and thus softened crown, is delivered in position, the housing 17 commences to descend. This moves the crowning mechanism down over the bottle 20 until the bottle has passed through the opening of the crowning throat and into the crown throat forcing the crown, now seated on the top of the bottle, against the plunger 41 arresting the downward movement of the plunger but permitting the continued downward movement of the housing 17 with the crowning throat thereby moving the portion 47 of the plunger from between the dogs 46, releasing the dogs and permitting the sleeve 21, under the influence of the coiled spring 22 and the downward movement of the housing 17, to be forced downwardly thereby moving the crown throat downwardly to surround the neck of the bottle. The continued downward movement of the housing 17 engages the cam sides 48 of the sleeve 36 to engage the cam portion 34 of the throat forcing the segments of the throat inward, causing the lips 33 to engage the sides of the crown, as illustrated in Fig. 3, molding the sides of the crown around the lip of the bottle. There is a sufficient pause after this has been accomplished and during the upward movement of the housing 1 to permit the plastic crown to seat in this position. Due to the fact that the lip 33 on the crown throat moves in beneath the edge of the crown and squeezes the edge around the bead of the bottle retaining the same in this position, with the sides of the throat bearing against the sides of the crown, this prevents the crown from cold flowing or spreading out as the plastic material under the bead is forced in position. By the time the parts are ready to move to their upward position, thus releasing the structure, the crown has become sufficiently cooled, due to the elapse of time and also due to the absorption of the heat from the crown by the crown throat, the crown is set in position on the neck of the bottle.

Figure 1:
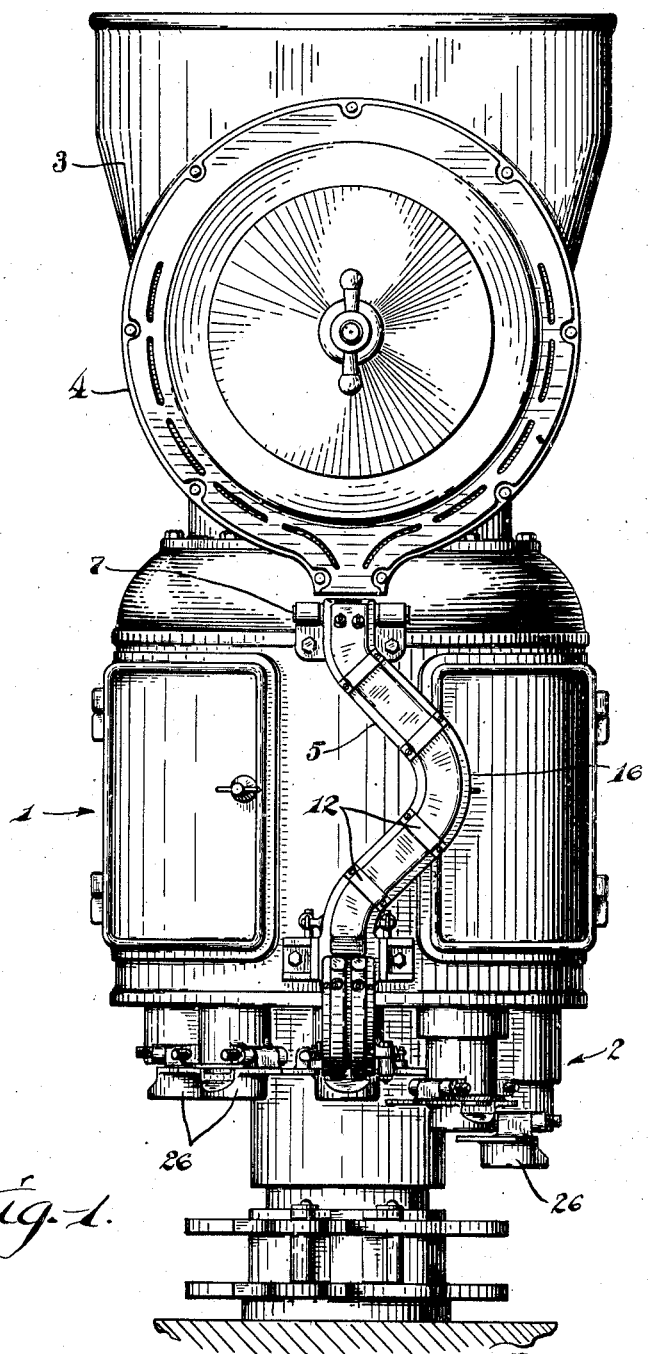
Figure 2:
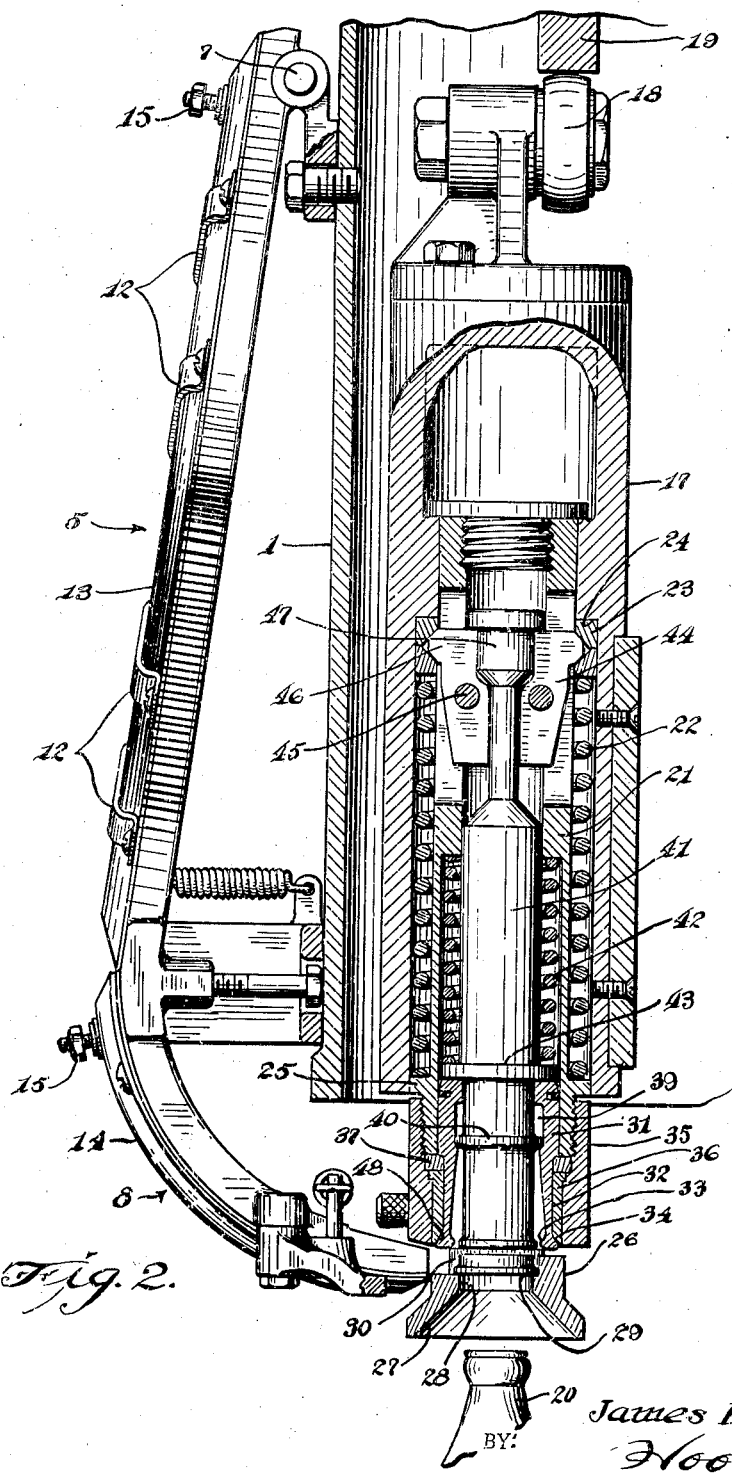
Fig. 2 is a longitudinal sectional view of the crown applying mechanism showing the crown chute.

In Fig. 5 I have illustrated a modification of the structure illustrated in the remaining figures. It will be noted in the structure illustrated in Figs. 2 and 3, the ring 36 is a solid ring. In the structure illustrated in Fig. 5 this ring is formed of a plurality of segments, which together form a complete ring. The segments are held in position by a suitable retaining spring 50. In other respects, the structure illustrated in Fig. 5 is substantially the same as that illustrated in Fig. 2. Due to this arrangement the crown throat will more readily adjust itself to the tops of the bottles, especially where there is a slight variation in the size of the tops of the bottles. However, the surrounding springs 50 are sufficiently powerful to exert a closing pressure and cause the throat to collapse about the crown as is done in the structure illustrated in Figs. 1 and 3.

I claim as my invention:

1. In a bottle crowning machine for applying plastic crowns having a downturned annular flange, a crown chute for conveying the crowns from a hopper to the point of application of the crowns, said chute including a channel shaped member providing a crown raceway and supporting the crowns in a flatwise position therein, with the flanges of the crowns facing the open side of the channel and disposed adjacent the sides of said raceway, and a heating unit comprising a cover for the open face of said channel secured to the legs of said channel and containing electrical heating units, said units being supported in said cover in a position to lie adjacent the legs of said channel, to thereby concentrate the greater portion of the heat developed by said elements on the flanges of a crown, as it passes through said channel.

2. In a bottle crowning machine for applying plastic crowns having a downturned annular flange, a channel shaped crown chute for conveying the crowns from the hopper to the point of application thereof, the channel of said chute supporting the crowns in a flatwise position therein, with the flanges of the crowns facing the open side of said channel, a cover member for the open side of said channel comprising a heating unit supported on the legs of the channel and having electrical heating units therein, said heating units being disposed adjacent the legs of said channel to concentrate the greater portion of the heat developed by said heating units on the flanges of the crown, as it passes through said channel, the heating units of that portion of the covering member more nearly adjacent the crown hopper having a higher heating capacity than the heating units more nearly adjacent the point of delivery of the crown.

JAMES KANTOR.

REFERENCES CITED

The following references are of record in the file of this patent:

UNITED STATES PATENTS

| Number | Name | Date |
| --- | --- | --- |
| 2,290,343 | Martin | July 21, 1942 |
| 1,379,118 | Marsa | May 24, 1921 |
| 1,614,168 | Abbott | Jan. 11, 1927 |
| 1,991,171 | Newton | Feb. 12, 1935 |
| 2,325,086 | Vore | July 27, 1943 |
| 2,325,309 | De Swart | July 27, 1943 |
| 2,340,354 | Wells | Feb. 1, 1944 |
| 1,511,745 | Mohler | Oct. 14, 1924 |
| 2,325,050 | Goodwin | July 27, 1943 |
| 2,047,846 | Wright | July 14, 1936 |
| 2,231,136 | Newey | Feb. 11, 1941 |
| 2,187,190 | Wilcox | Jan. 16, 1940 |
| 1,965,550 | Kniesche | July 3, 1934 |